United States Patent [19]

Laimins

[11] 3,949,603

[45] Apr. 13, 1976

[54] STRAIN GAGE TRANSDUCER

[75] Inventor: Eric Laimins, Belmont, Mass.

[73] Assignee: Hottinger Baldwin Measurements, Natick, Mass.

[22] Filed: July 1, 1974

[21] Appl. No.: 484,702

[52] U.S. Cl............. 73/141 A; 73/88.5 R; 177/211

[51] Int. Cl.².............................................. G01L 1/22

[58] Field of Search....... 73/141 A, 88.5 R; 177/211

[56] References Cited

UNITED STATES PATENTS

| | | | |
|---|---|---|---|
| 2,597,751 | 5/1952 | Ruge | 73/141 A X |
| 3,320,569 | 5/1967 | Jones | 73/141 A X |
| 3,453,873 | 7/1969 | Lambert | 73/88.5 R |
| 3,554,025 | 1/1971 | Andersson et al. | 73/141 A |
| 3,736,795 | 6/1973 | Andersson | 73/141 A |
| 3,772,912 | 11/1973 | Andersson | 73/141 A |

*Primary Examiner*—Charles A. Ruehl

[57] ABSTRACT

A strain gage force measuring transducer is described in which distortion of measurements of a given strain on a given surface due to the interaction between the given strain and a second strain is eliminated by making a combined measurement of both strains on that same surface, equating the measured value of the second strain with the value of the distortion, and entering the so measured and equated value of the second strain into the combined measurement with a sign opposite to the sign of the distortion so as to cancel same. In a typical use, a shear beam shear-type transducer having a high degree of point-of-load insensitivity is provided thereby.

14 Claims, 17 Drawing Figures

22

32

30

34

28

26

24

40
R3
38
50
46
44
N.A.
R1
R4
R2
48
52
36
42

40
38

62
N.A.
36

54
$T_s + T_b$
$C_s + C_b$

R1
R2
60
58
Ni
Ni
R4
R3
56
$C_s + C_b$
$T_s + T_b$
OUTPUT
EXCITATION

40
R4
38
44
R2
52
48
N.A.
50
R3
36
R1
46
42

40
38

62
N.A.
36

54
$T_s + C_b$
$T_b + C_s$

R1
R2
60
58
Ni
Ni
R4
R3
56
$C_s + T_b$
$C_b + T_s$
OUTPUT
EXCITATION

+SBEND
N.A.
SHEAR + BEND
−SBEND

+SBEND
N.A.
SHEAR + BEND
−SBEND

+SBEND
N.A.
SHEAR − BEND
−SBEND

+SBEND
N.A.
SHEAR − BEND
−SBEND

+SBEND
64
66
N.A.
SHEAR + BEND
−SBEND

+SBEND
64
N.A.
66
SHEAR − BEND
−SBEND

+SBEND
64
66
N.A.
SHEAR + BEND
−SBEND

+SBEND
72
N.A.
68
70
74
SHEAR + BEND
−SBEND

STRAIN GAGE TRANSDUCER

BACKGROUND OF THE INVENTION

This invention relates in general to strain gage transducers for measuring forces in which an electrical resistance type strain gage is affixed to the surface of an elastic member or beam which is subjected to a force. The strain in the member or beam due to the applied force changes the electrical resistance of the gage in proportion to the strain and the force can thereby be measured electrically.

Such gages came into use in World War II and have been steadily improved since then. They are so convenient to use, the gage itself is so small, and the ready use of the output of the gages in electrical circuits and consequent ease of conversion to digital form for data processing, has led to an ever increasing demand for their use and for their improved accuracy.

A typical use for such transducers is in weighing materials. Of course, gravimetric scales of the balance beam type have been used for centuries for weighing, whenever accuracy is required, whereas spring balance weighing devices have traditionally been considered relatively crude and inaccurate. Strain gage transducers, of course, fall into the general category of spring balances, and all of the problems which are inherent in the conventional spring balance context, such as sensitivity to changes in temperature, fatigue, aging, creep, etc. are present also in the strain gage context.

Many of these problems however have been largely solved. For instance, very effective methods for compensating for temperature change have been worked out for strain gages. Other problems such as creep compensation, relaxation compensation and humidity variation compensation have also been solved or largely reduced.

One of the primary problems, however, still requiring solution is the point-of-load sensitivity problem, particularly when vertical forces only are to be measured. It will be understood, of course, that whenever the context permits the weighing platform to be supported by a parallelogram cantilever configuration the point-of-load sensitivity problem can be virtually eliminated. This configuration has been used primarily with low value force strain gage transducers, very effectively (see e.g. U.S. Pat. No. 2,866,059 and 3,439,761). The parallelogram configuration of these cited patents permits the vertical force component to be measured independently of the variations in the point-of-load, provided the gages are very accurately located so as to measure the strain at two or more locations on the parallelogram configuration. In fact even greater accuracy can be attained by compensating electrically for minor discrepancies in the location of the gages (see e.g. U.S. Pat. No. 3,576,128). In the parallelogram configuration the strain gages are actually mounted so as to measure the bending strain at two or more locations on the parallelogram but this does not mean that the bending moment of the overall system is being measured. In fact, the manner in which the outputs of the strain gages are used, cancels out the effect of the bending moment and gives a measurement strictly of the vertical (shear) forces acting on the transducer. The principal advantage of the properly gaged parallelogram type configuration is that it permits the vertical forces to be measured independently of variations in the point-of-load.

The parallelogram configuration, however, although good for lighter weights, is not suitable for measuring heavy weights (e.g. 10,000 lbs. and greater). Obviously, a massive parallelogram element might be devised which would have low point-of-load sensitivity for such large forces, but it would be undesirably bulky for many uses.

For the measurement of larger forces, transducers having gages positioned to measure the vertical forces directly in terms of shear only have been used with only moderate success. Shear forces are normally measured by aligning the strain gages so as to measure both the tensile or compressive principal strains. Usually for shear measurements, the gages are mounted at 45° and 135° from the longitudinal axis of the beam of which shear force measurement is to be taken. However, at such an angle the shear force measuring gages will also measure bending strain unless they are accurately located at the neutral bending axis because bending stress acts horizontally in tension above the neutral axis of the beam and horizontally in compression below the neutral axis. Placing the shear force measuring gage on the neutral axis eliminates this because when the gage is so positioned, one half of the gage lies in the upper (tensile) area of the bending stress, and the other half lies in the lower (compressive) area of the bending stress so that the effects of bending stress on the shear measurement will theoretically cancel out. Another way to achieve the same result is to use two compressive and two tensile shear force gages and to place one tensile gage and one compressive gage above the neutral axis and the other tensile gage and the other compression gage a similar distance below the neutral axis. With such an arrangement, theoretically, the influence on the gages of the bending strains can be cancelled out.

A prior art patent in which both of the latter methods for isolating the measurement of shear force stress from bending stress is U.S. Pat. No. 3,554,025. In addition, U.S. Pat. No. 3,554,025 also discloses two other ways to eliminate or minimize the effect of bending stress. One is to provide a double beam which has a base beam and a second beam connected to the free end of the base beam and extending back over the base beam. With this arrangement the gages are affixed to the base beam at a point where they are in line with (or balanced to each side of) the thrust axis of the load. In this way the gages sense only shear related strains, and when the point-of-load position changes, the change of lever arm which causes a change in bending moment which would distort the measurement of shear, is so small that its influence is negligible. Further improvements can be made by selecting a cross-sectional geometry in which there are locations at which the strain gages can be applied where bending strain is minimized and shear strain is maximized. Typically, this is done with an I-beam configuration. With an I-beam, the shear strain is highest and relatively uniform in the vertical web area, and therefore the I-beam configuration is recommended in U.S. Pat. No. 3,554,025 for the specific purpose of maximizing shear related stresses at a location where the bending related stresses are relatively low. Of course, this is done for the basic purpose of maximizing the shear strain measurement and thereby rendering the transducer less sensitive to changes in the point-of-load.

It is a fact, however, that the foregoing measures have not achieved their objective. The double (or triple) beam arrangement of U.S. Pat. No. 3,554,025 is not adequate for very heavy loads unless it is constructed with prohibitively massive components. In addition, the use of techniques such as the careful positioning of the gages, and the selection of special cross-sections have not been altogether successful. In a typical conventional arrangement employing a straight cantilever beam, the transducers usually have no greater point-of-load sensitivity than 0.3% per one-fourth inch of displacement of the load. At first glance, one might regard such an insensitivity as being rather good, but in practice, with massive loads upwards of 10,000 lbs., it is virtually impossible to reduce the unavoidable changes in point-of-load to less than one-half inch. This is due largely to changes in the dimensions of the load platforms due both to thermal expansion and loading variations. Where extremely heavy forces are involved, since knife edge pivots are impractical, arcuate supports are employed, but with such supports, when the platform (or transducer) bends, an automatic change in the "point-of-load" application occurs. In many cases the change exceeds one-half inch. Such a change, however, with the conventional transducer, would represent a 0.6% error, and in the bulk-materials industry, would be prohibitively large. Government regulations require greater accuracy.

Prior to the present invention, no strain gage transducer solution to the point-of-load sensitivity problem for very heavy weights, better than 0.3% per one-fourth inch of motion, has been available. It would appear that all prior attempts to eliminate the effects of bending stress, and to employ geometries selected in order to minimize bending strain, have not succeeded in eliminating or sufficiently reducing a certain inevitable and hitherto not fully appreciated interaction between the bending and the shear strains which distort the shear force measurements. The result has been that point-of-load sensitivity has remained a major problem.

OBJECTS OF THE INVENTION

Accordingly, it is a basic object of the present invention to provide a single cantilever beam strain gage transducer which is virtually point-of-load insensitive. Another object is to accomplish the foregoing with reduced mechanical and electrical complexity compared to conventional transducers. A further and more specific object is to provide such a transducer for more efficiently and accurately measuring not only very large forces, but also small forces.

BRIEF DESCRIPTION OF THE INVENTION

The present invention starts from the proposition that there is a resultant interaction between bending and shear strains which distorts the shear strain measurement in a given plane and which cannot be eliminated by the mere cancellation of the measurement of bending strain. The general existence of this distorting interaction was previously known. This invention, however, makes use of two hitherto unobserved aspects of the distorting interaction. The first of these is that the distortion of the shear strain measurement is substantially less affected by the position at which the shear strain measurement is taken along a given vertical line than is the bending strain measurement. The second is that, for gages affixed to a beam on a shear strain surface (i.e. a surface which is parallel both to the axis of the beam and the line of the force being measured) the distortion of the shear strain measurement caused by bending is so little affected by changes in shear strain that a measurement of bending strain taken on the shear strain surface will be sufficiently directly proportional to the distortion of the shear strain measurement caused by bending that the bending strain measurement alone can be used and calibrated to represent an accurate measurement of the shear strain distortion over a wide range of shear strain measurement variations.

I employ these two factors in the following way. Instead of trying physically to minimize the bending strain, or electrically to cancel its measurement, I specifically measure it and combine it with the measurement of both shear strain and the shear strain measurement distortion. Also I position the gages on the shear strain surface and connect them electrically so that the signs of the distortion and the bending strain are opposite, and I select parameters for the bending strain measurement, which give a value which is substantially equal to and opposite of the value of the distortion of the shear strain measurement caused by bending strain. In this way, if the bending moment is increased, for example, without an increase in shear force, as by changing the point-of-load, the bending strain component of the total measurement will increase and consequently the absolute value of the distortion component of the total measurement will also increase. However, since the magnitude of these changes is substantially equal and the signs thereof are opposite such a change in point-of-load causes no change in the total output. Thus, the total measurement is proportional to the load regardless of changes in the point-of-load. Conversely, if a change in shear force occurs, as by changing the weight on the scale platform, no loss of accuracy occurs because the bending strain, shear strain and distortion all change simultaneously and in direct proportion.

Employing such an arrangement, I have been able repeatedly to exceed a point-of-load insensitivity of 0.03% per one-fourth inch point-of-load movement at 60,000 to 100,000 lbs. load.

There are a variety of ways in which the required parameters for the foregoing relationship between bending strain and shear strain can be established. For instance, for any given location of the shear strain gages, apart from the neutral bending axis, the value of the bending strain measurement component of the gages can be selected to equal the shear distortion factor. Conversely, for any given value of bending strain, the distance at which the gage is located from the neutral axis can be selected to give a gage output due to bending equal to and opposite of the shear distortion factor. Other ways include fixing the gage values and locations and changing the ratio between the distortion factor and the shear strain measurement. Also this can be done by changing the geometry of the cross-section.

It is a feature of my invention that its objects can be accomplished merely with the same types and numbers of shear strain gages that are used in the conventional shear-type force transducers, i.e. two positioned at 45° and two at 135° above and below the neutral bending axis. The differences, however, from the conventional form are, first, that the gages are connected in the Wheatstone bridge circuit in such a way as to include the bending strain measurement, in the bridge output rather than to eliminate it; and, second, the distance of the respective gages from the neutral axis is selected specifically to give a component of bending strain measurement the value of which is equal to and opposite of the shear strain measurement distortion. Doing this with merely four gages represents a substantial economy.

The way in which the distance of such gages from the neutral axis is selected is most conveniently done by trial and error. Of course, it can be calculated, theoretically, but such a calculation would be extremely difficult for any cross-section other than the most rudimentary of forms. The trial and error method is not difficult and once the correct positioning for a given cross-section has been determined, repeatability of performance in production is feasible without requirement of individual calibration.

It is also a feature of my invention that there is no special advantage for me to employ a cross-section which favors the measurement of shear strain apart from bending strain because, by my invention I can effectively eliminate the harmful effects of the interaction of these two strains. Accordingly, I can employ solid, cylindrical, square and other cross-sections whichever may be appropriate for a given application, and whatever distortion may be caused by the interaction between bending and shear can be eliminated by the use of my invention. In addition, this invention permits me to chose specific cross-sections and place the gages thereof in such a way as to minimize the effects of adverse loads, without being concerned about the interaction between bending and shear on a shear strain surface.

Still another feature of my invention is that it can provide an extremely simple shear force transducer which is point-of-load insensitive for any value of force measurement. Thus, although its unique application is in measuring extremely large forces where nothing in the prior art is satisfactory, it also has advantages in the measurement of small forces, because even though the prior art parallelogram configuration transducers have been excellent for point-of-load insensitivity in the context of small force measurements they are more complicated to manufacture, and they depend more critically on the accuracy of gage positioning. Thus, the device of this invention is more suitable in many instances also for small force measurements.

Another feature of my invention is that the critical relationship between the shear and bending strain measurements can be achieved also by changing the angle of the gages rather than the spacing. This can be advantageous when size requirements prevent obtaining the required relationship within a given space.

A general feature is that I accomplish the foregoing advantages without at the same time degrading any of the other performance characteristics of the transducer, such as insensitivity to adverse loads, insensitivity to temperature changes, reliability, ability to withstand overload, etc.

DETAILED DESCRIPTION OF THE PRESENT INVENTION

Figure 1:
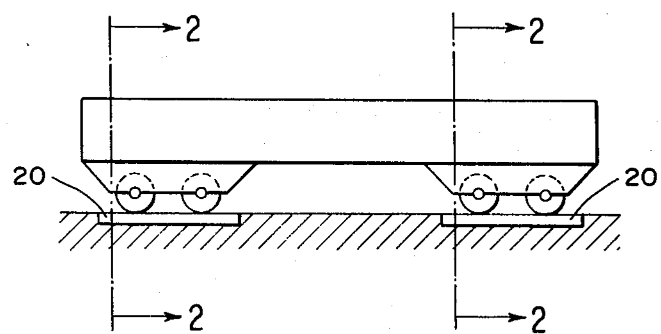
FIG. 1 is a side view of a railroad car resting on strain gage transducer type weighing devices in which the present invention may be used.
Figure 2:
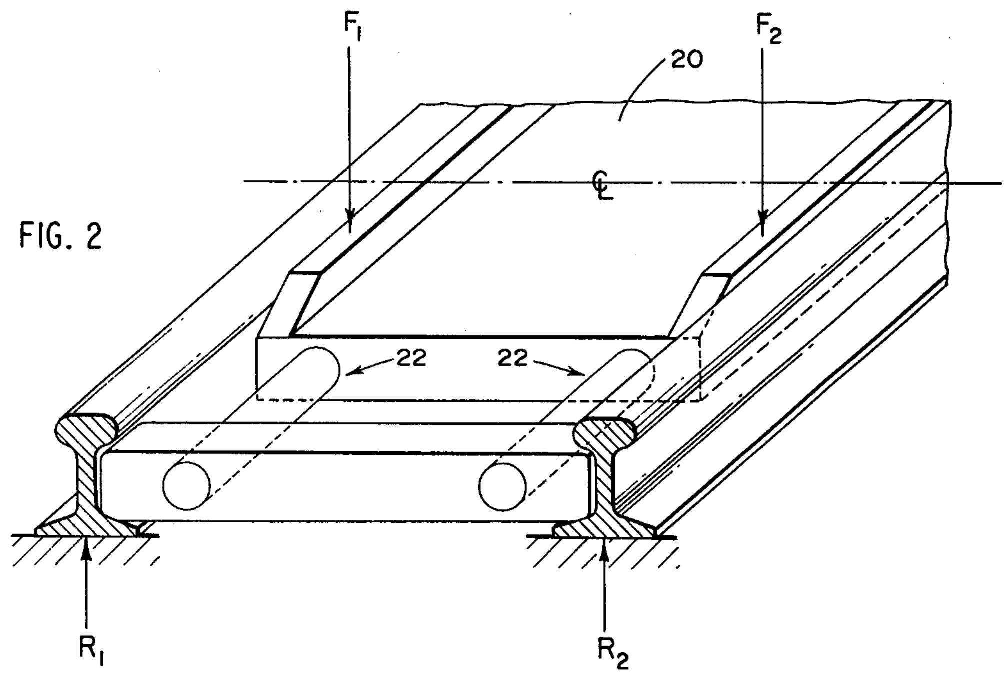
FIG. 2 depicts a perspective view of one end of one of the weighing devices of FIG. 1 as seen when looking to the right from one of the lines 2—2 of FIG. 1.

As I indicated briefly above, the present invention starts from the proposition that there is a resultant interaction between bending and shear strains in any beam type force transducer which distorts the shear measurement and which cannot be satisfactorily eliminated by the mere electrical or mechanical cancellation of the measurement of bending strain shown in the prior art. Using the facts (a) that the distortion of the shear strain measurement is less affected by the position at which the shear strain measurement is taken on a vertical axis in a plane normal to the axis of the beam, than is the bending strain measurement, and (b) that the shear strain gages can be positioned on a shear strain surface apart from the neutral axis of the beam so as to measure bending strain in part, and electrically connected so that the part of the measurement due to bending strain is opposite in sign to the distortion induced by bending in the shear strain measurement, and that the net strain sensed by each strain gage is the algebraic sum of the tensile and compressive bending and shear related strains induced thereon plus the distortion. I have found that the portion of the net strain sensed by each gage which is solely bending related can be used to additively or subtractively augment the shear related measurement such that the distortion therein can be satisfactorily compensated over a wide range of forces.

It is useful to consider in the analysis of the present invention that the objective is to provide a strain gage in which the electrical resistance varies in direct proportion to the actual shear strain (shear strain without distortion). In the conventional arrangements, however, the electrical resistance of such gages does not do this even when the gages are placed on (or balanced about) the neutral axis. Instead, their resistances vary in direct proportion to the apparent shear strain, (the actual shear strain plus the distortion factor mentioned above). Since the apparent shear strain in those devices is influenced by changes in the point of load, such prior art transducers are "point of load sensitive". In the present invention the gages are located and oriented (as hereinafter more fully described) on the shear strain surface to have their electrical resistance changed by changes in both the apparent shear strain and by changes in bending strain, and with the net resistance changes of the gages being substantially responsive in direct proportion to changes in actual shear strain. In this way the electrical circuit which is coupled to the gages is likewise responsive to the net resistance changes and gives a reading which is directly proportional to the actual shear strain. This results in a reading which can be calibrated to indicate the force being measured substantially independently of the location of the load point of the force longitudinally of the beam.

As shown in the accompanying drawings a typical embodiment of my invention is employed in weighing railroad cars, wherein a pair of scale platforms 20 are positioned to receive and support in weighing position the end trucks of a railroad car. The platforms 20 are each supported by four strain gage transducers indicated at 22, one at each corner. The transducers each comprise a generally cylindrical stainless steel beam 24 appropriately anchored to a corner end of the platform 20 and supported at its other end by an upstanding lug 26 fitting into a recess 28. The upper end of the lug 26 is arcuate and is adapted to support very heavy loads. In a typical installation, the beam 22 is 4 inches in diameter and the lug 26 and beam 22 are adapted to support up to 100,000 lbs.

It should not be considered, however, that I intend to limit the application of my invention to a single beam having only one free end because its usefulness also applies in the context of a structure having a multiplicity of beam-like components, as well as composite beams employing multiple arms.

Figure 3:
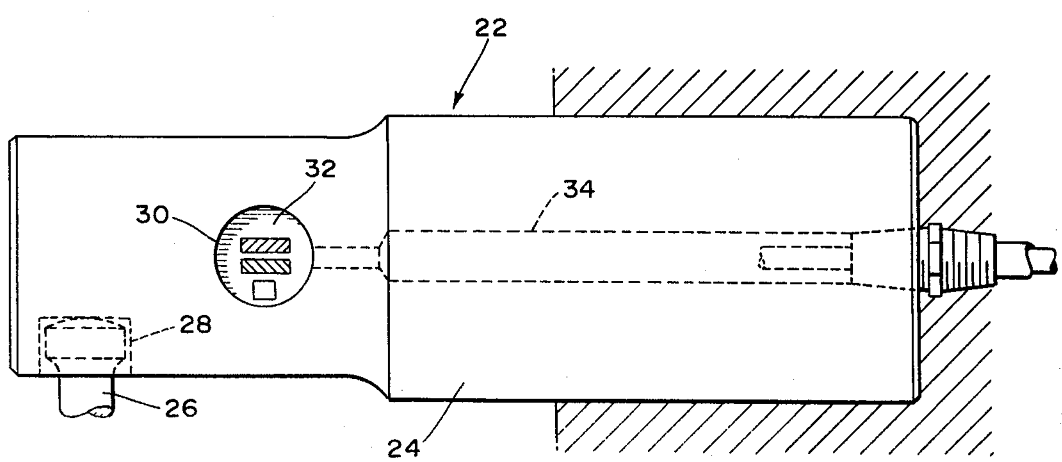
FIG. 3 is a side view of a representative strain gage force transducer in accord with the present invention.

The beam 24 is machined to provide a pair of symmetrically disposed cylindrical recesses 30 (one only being shown in FIG. 3) defining between them a flat web 32 which, in this embodiment, is relatively thin and is vertically disposed. Since the surface web 32 is in a plane parallel to the axis of the beam 22 and is also parallel to the force being measured (i.e. vertical), it responds to shear forces and it therefore referred to herein as a "shear strain surface" as distinguished from the horizontally disposed surfaces (not on the neutral axis) which would be referred to as "bending strain surfaces".

The beam 22 is also machined to provide a central opening 34 in communication with the recesses 30 to house and protect leads to strain gages.

Figure 4:
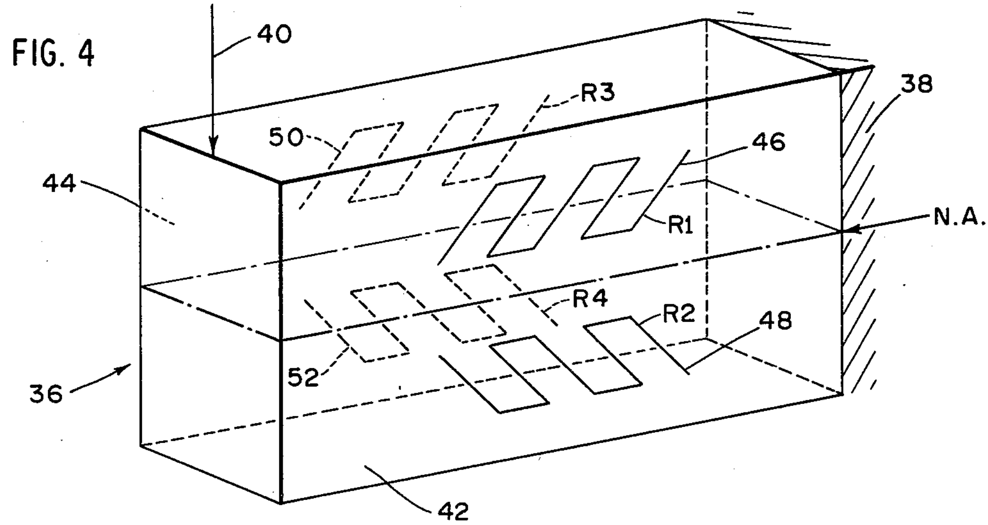
FIG. 4 is a perspective view of a diagrammatic representation of a strain gage force transducer in accord with the present invention wherein the strain gages are shown in enlarged relationship to the unit.
Figure 5:
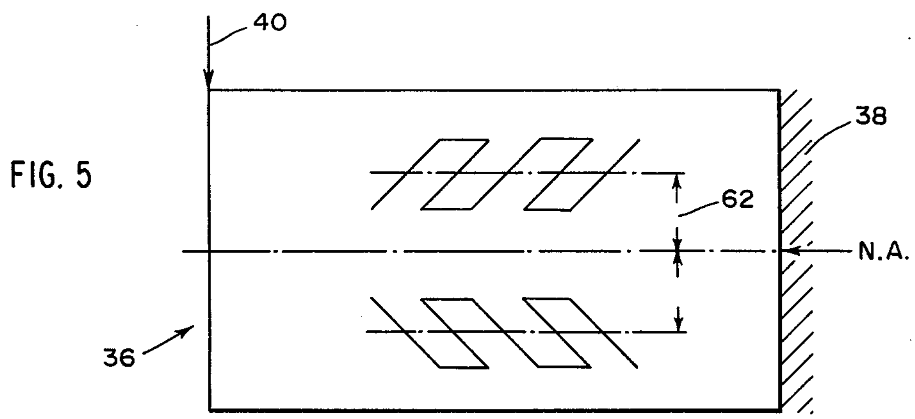
FIG. 5 is a side view of the diagrammatic representation of the strain gage force transducer of FIG. 4.

In order to facilitate the discussion, I have depicted in FIG. 4 a diagrammatic representation of a beam indicated at 36 fixed at 38 and having a force applied to its free end at 40. The neutral axis of the beam 36 is indicated by the line labelled N. A. Vertical surfaces 42, and 44, parallel to the axis of the beam, one on each side of the beam, represent a pair of shear strain surfaces and correspond to the exposed surfaces of the web 32 at the bottom of the respective recesses 30 shown in FIG. 3.

Strain gages are mounted on the shear strain surfaces 42 and 44. In a typical installation I employ four gages 46, 48, 50, and 52 as shown in FIG. 4. Strain gages 46 and 48 are mounted on shear strain surface 42. Gage 46 senses the tensile strain due to shear ($T_s$) and the tensile strain due to bending ($T_b$) induced at 45° from the neutral axis N. A., and gage 48 senses the compressive strain due to shear ($C_s$) and the compressive strain due to bending ($C_b$) induced at 135° from the neutral axis. Strain gages 50 and 52 are similarly mounted on the rear face 44 of the beam 36 such that gage 50 senses the same strains as gage 46 ($T_s$ and $T_b$) and gage 52 senses the same strains as gage 48 ($C_s$ and $C_b$).

The strain gage pairs 46 and 50 and 48 and 52 are in any case mounted directly opposite each other on their respective shear strain surfaces with their grids parallel. This minimizes compensation problems and takes advantage of the fact that since all measurements are made on the vertical shear strain surfaces 42 and 44 such factors as application procedures and temperature compensation are minimal in number and may be standardized.

Figure 6:
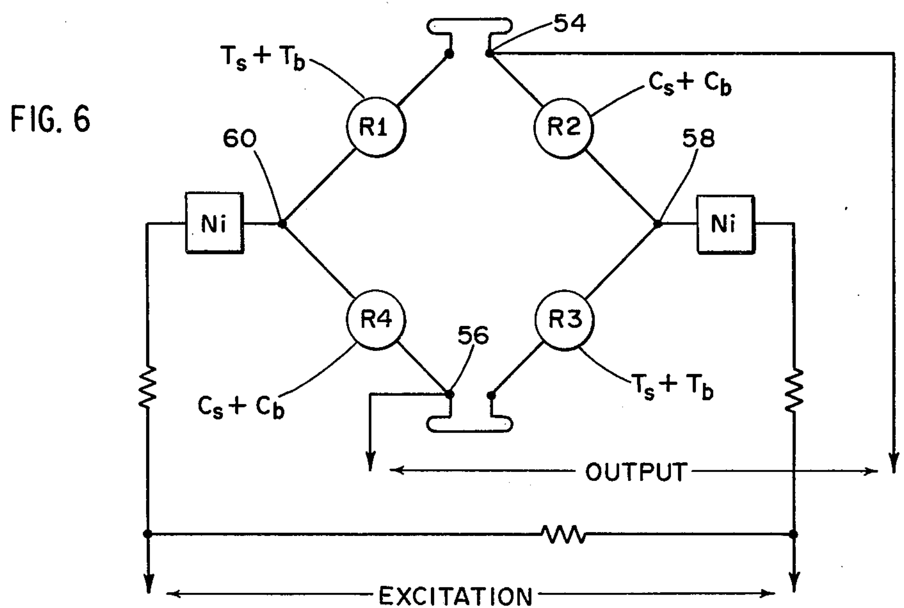
FIG. 6 is a schematic of a Wheatstone bridge type circuit suitable for use with the strain gage force transducer of FIG. 4 connected in accord with the present invention.

In combination with the above strain gage orientation, the present invention employs a Wheatstone bridge circuit as shown in FIG. 6 wherein the strain gages 46, 48, 50 and 52 are interconnected as the resistance elements R1–R4. The interconnection is such that gage 46 corresponds to R1, gage 48 corresponds to R2, gage 50 corresponds to R3, and gage 52 corresponds to R4. It is also apparent from FIG. 6 that in the present invention, the output of the bridge circuit is read across terminals 54 and 56, with terminals 58 and 60 connected to an external power source.

The above-described circuit will produce an output of the bridge of FIG. 6 which includes both the bending and shear strain measurements and including the influence of the distorting interaction between bending and shear. Specifically, strain gages 46 and 50 sense $T_s$ and $T_b$ while strain gages 48 and 52 sense $C_s$ and $C_b$. Thus, the resulting changes in strain gage resistance yield a change in output across terminals 54 and 56 due to shear as well as a change due to bending, the latter in the same direction as the change due to shear. There is, however, a distorting interaction between bending and shear which, in this case has a negative effect on the total output of the bridge, but since the value of the bending strain component of the measurement is selected to be equal and opposite to the distortion factor due to the effect of bending on shear the two offset each other. Since the bending component, in this instance, is added to the shear component, I refer to this as the additive mode of compensation.

Figure 7:
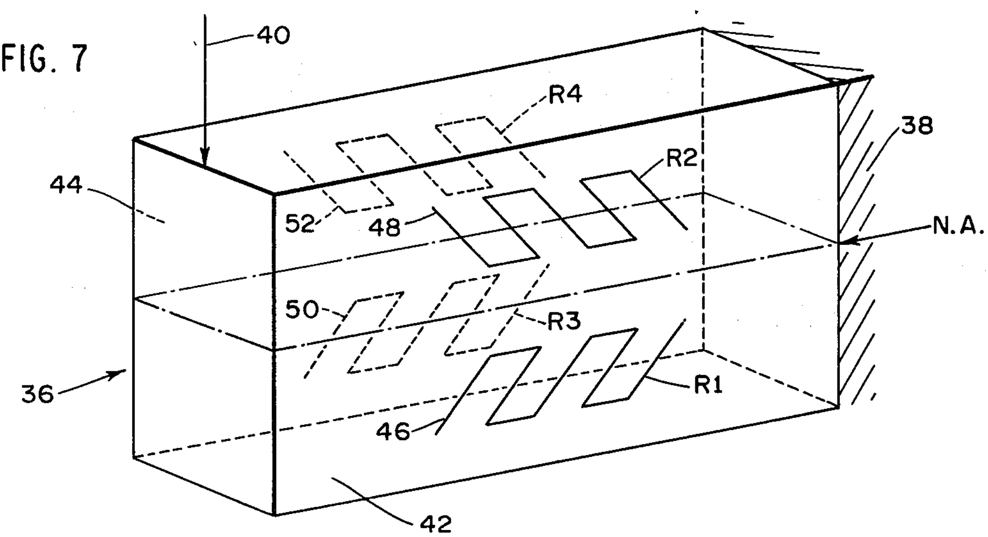
FIGS. 7–17 show various strain gage configurations and orientations within the scope of the present invention.
Figure 8:
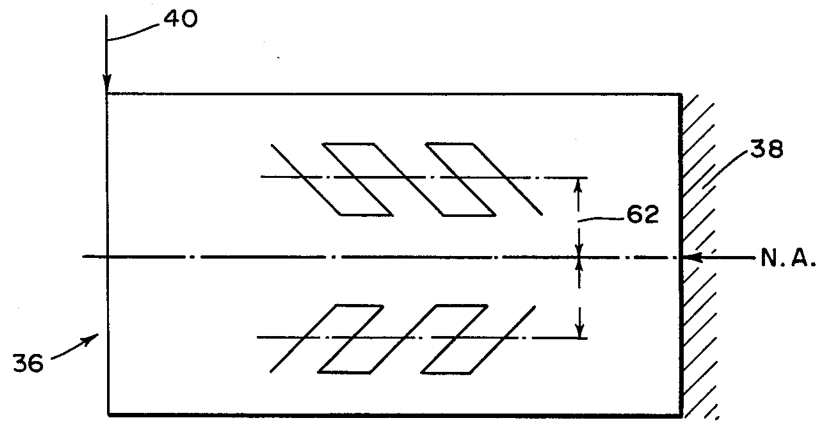
Figure 9:
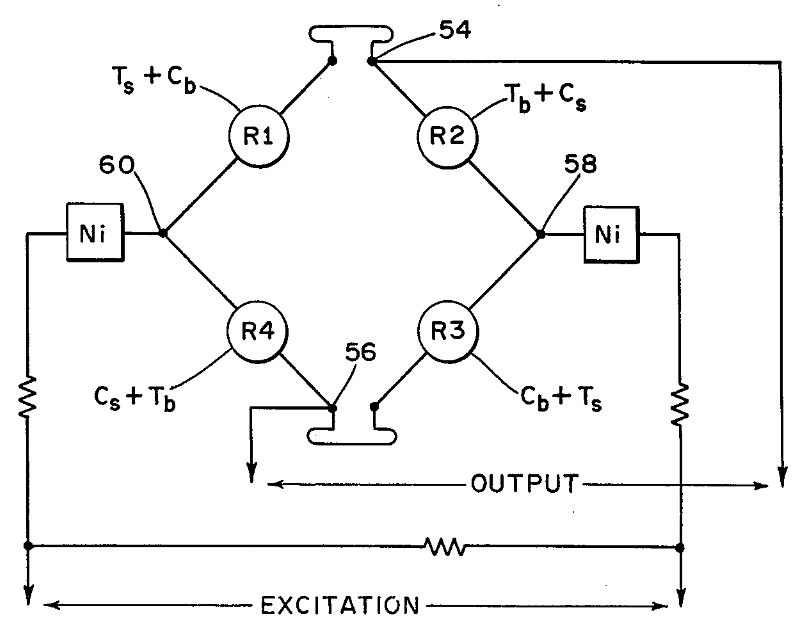

A similar analysis holds true if the distortion factor due to the effect of bending on shear has a positive effect on the total output of the bridge, as can be the case with some complex beam configurations. However, when this condition exists, it requires inverting the position of the gages relative to the neutral axis. This is shown in FIGS. 7, 8, and 9 where it will be seen that gages 46 and 50 are mounted so as to sense $T_s$ and $C_b$ while gages 48 and 52 are mounted so as to sense $T_b$ and $C_s$, the bridge interconnection being such that gage 46 corresponds to R1, gage 48 corresponds to R2, gage 50 corresponds to R3, gage 52 corresponds to R4. Thus, the output of the bridge due to bending strain is subtracted from the output due to shear, and the value of the bending strain component of the measurement is selected to be exactly equal to and opposite of the distortion on shear strain measurement due to bending which is in this case positive. In this way the bending component and distortion component merely cancel each other out. Since the bending component is subtracted from the shear component, I refer to this as the subtractive mode of compensation.

In either the additive or subtractive mode, the combination of the measurement of the bending and shear strains is employed in such a way as to substantially reduce, and virtually eliminate, the change in the total output of the bridge due to changes in the point-of-load. For example, referring to FIG. 4, as the applied load (at 40) is moved inward (to the right) the measured shear-related strains ($T_s$ and $C_s$) increase as a result of reduction of the negative going interaction of the shear and bending stresses. At the same time, of course, the measured bending strains ($T_b$ and $C_b$) decrease because of the lower applied bending moment. With optimum positioning of the gages from the neutral axis, the decrease in the total output of the bridge due to the decrease in the bending related strains will be offset by an equal and opposite increase in the total output due to decreasing the negative going distortion factor. Since strain gages 46 and 50 sense the sum of the tensile shear, the distortion factor, and the bending strains, and strain gages 48 and 52 sense the sum of the compressive shear, the distortion factor and the bending strains, the total strain sensed by the combination remains essentially constant. Hence, the total bridge output will be virtually insensitive to changes in point-of-load. In practice, load position sensitivity reductions of greater than 15 to 1 have been achieved over the prior known forms.

The behavior of the subtractive compensation mode, where the distortion factor is positive, is similar but opposite. Thus, in the subtractive mode, as the applied force is moved inward, the positive going distortion factor decreases as the bending strain decreases. However, strain gages 46 and 50 sense the algebraic sum of the tensile shear, the distortion factor, and the compressive bending strains, while gages 48 and 52 sense the algebraic sum of the compressive shear, the distortion factor, and the tensile bending strains; and the bending strains sensed are in subtractive relationship to the shear strains sensed. In addition, the selected value of the part subtracted is equal and opposite to the positive going distortion factor. Therefore, the net strain sensed by the gages remains the same and the transducer is, therefore, virtually insensitive to changes in the point-of-load.

Complementary conditions exist, of course, if the load is moved outward such that, likewise, no change in transducer output results.

In addition, there is very little counter-interaction of shear on bending, because transducers compensated according to my invention exhibit no observable loss in the accuracy of the compensation over a wide range of shear strain variations, due to changes of load from zero to 100,000 lbs.

Figure 10:
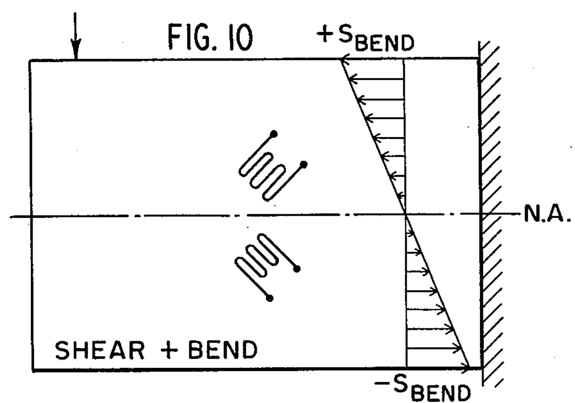
Figure 11:
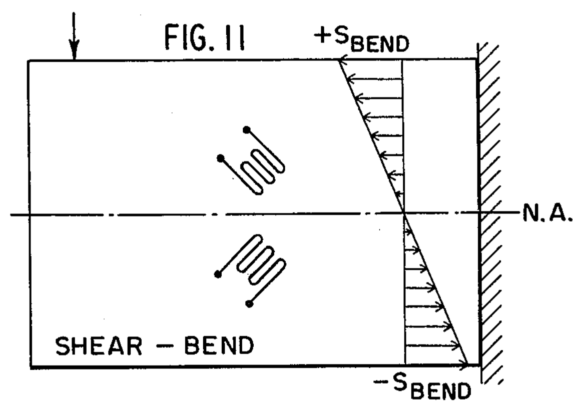

In FIGS. 10–17, I have shown various forms and gage dispositions coming within the scope of my invention. In FIGS. 10 and 11 I have shown the additive and subtractive modes of FIGS. 4 and 7 respectively merely depicting the gages in a more realistic manner. It will be understood that the bridges of FIGS. 6 and 9 can be established with fixed valves for three of the resistances, and the output of a single gage can provide the entire force measurement. In this case the single gage can still be referred to as a composite gage because I am employing it to measure both bending strain and shear strain, together with the distortion factor. Of course, such a transducer would not enjoy the benefits of insensitivity to adverse loads of the embodiments employing four gages, and the output of the bridge would be only one-fourth of that of the four gage form. But yet it is still a feasible arrangement, and represents a substantial saving for a case which can tolerate such reduction of total performance. In addition, in an arrangement which employs a transducer at the four corners, of a platform, each transducer can be of the single gage form, and with the single gage affixed respectively on each in the locations of FIGS. 4 or 7 (depending upon the mode employed). In this case a single electrical bridge is employed, and some of the added benefits of the form of FIGS. 4 and 7 are enjoyed. Still more of these benefits are enjoyed by an arrangement such as is shown in FIGS. 10 and 11 employing two gages only on complementary shear strain surfaces of two transducers at opposite corners of one end only of a platform, and electrically connecting the four gages in a single bridge.

Figure 12:
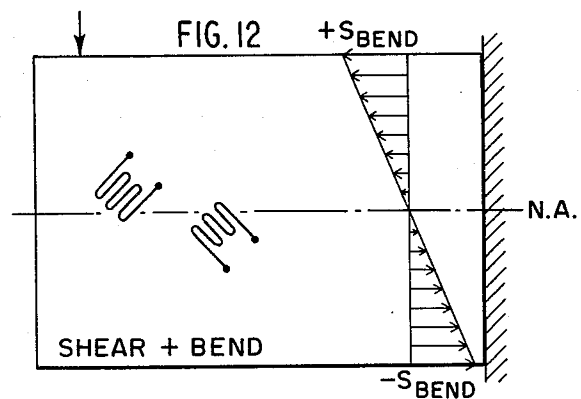
Figure 13:
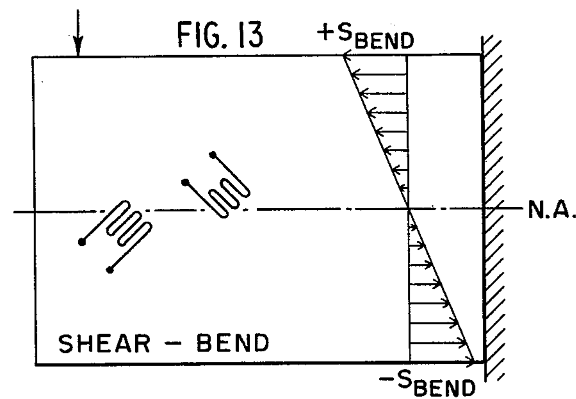

In some cases where space considerations are critical it may be necessary, to place the gages at different positions longitudinally of the axis of the beam as in FIGS. 12 and 13. Since the distorting interaction varies substantially in direct proportion to the bending strain, the variation in bending strain due to such a change of longitudinal position is unimportant. This also illustrates a general advantage of my invention. Since the precise longitudinal positioning of the gages is not critical, care need only be taken with respect to the distance of the gages from the neutral axis.

It will be understood that a major advantage of my invention is that it permits the manufacture of a composite gage on a single backing on which all of the gages which are to be affixed to a single shear strain surface are mounted. Thus, once the proper spacing from the neutral axis has been established, two gages in FIGS. 10–13 can be assembled on a single backing, and thereafter affixed to the shear strain surface in a single affixing operation. This represents a substantial saving in labor, and also permits standardization of compensation procedures. In addition, when two gages are formed on a single backing with the optimum vertical spacing between them, the precise vertical positioning of the assembly on the shear strain surface is not particularly important because the compressive and tensile bending strains are simply summed in the equation. It is not important that one is a little further from the neutral axis than the other as long as the sum remains the same. The only adverse influence coming from non-symmetrical vertical positioning in such a case, exists in the more-or-less secondary area of errors due to adverse loads.

Figure 14:
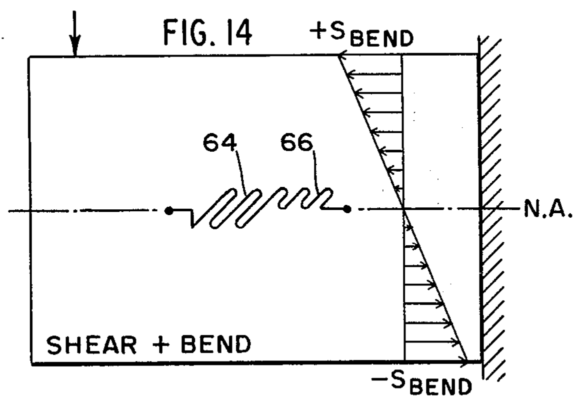
Figure 16:
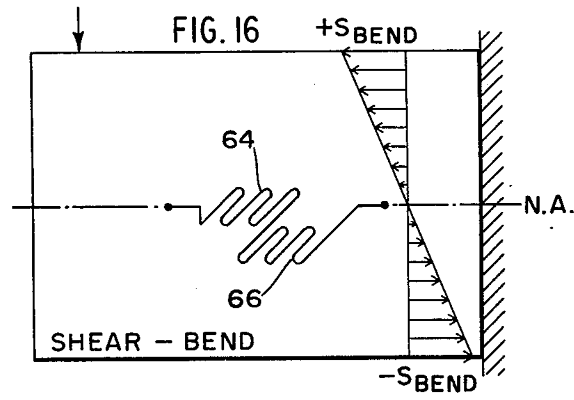
Figure 15:
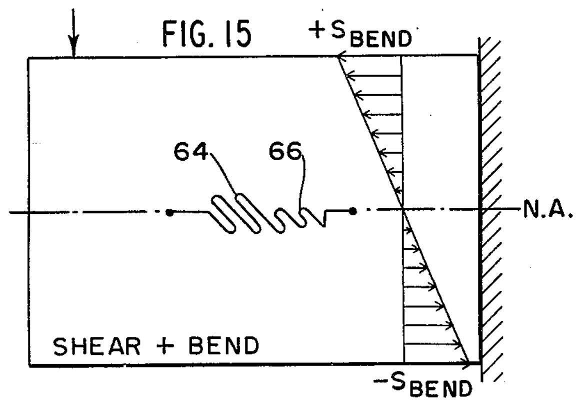
Figure 17:
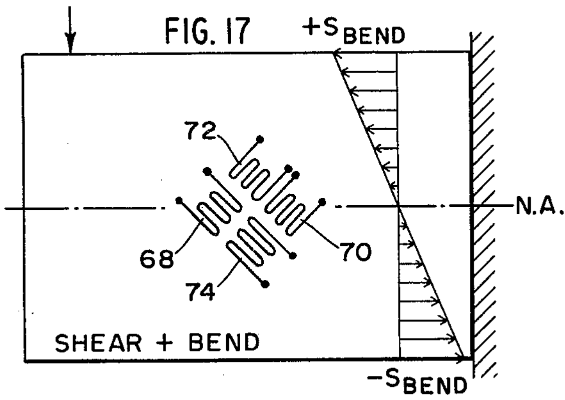

A single gage can employ a portion 64, as in FIGS. 14, 15 and 16, designed for pure shear strain measurement mounted on the neutral axis together with an extension 66 separated from the neutral axis the appropriate distance to introduce the desired compensating measurement of the bending strain. Of course, the electrical resistance (or the gage factor) of the portion 66, and its location away from the neutral axis are selected in relation (equal and opposite) to the distortion factor present. Likewise an electrical contact or tap can be employed between portions 64, and 66 in order to insert a "trimming" shunt resistor parallel to portion 66 if desired. In addition, other forms and orientations of the portion 66 to enhance or decrease its sensitivity to bending strain can be employed. Also the portions 64 and 66 need not be connected. Thus, separate gages can be employed on each shear strain surface as in FIG. 17, for measuring shear strain in compression for instance by gage 68, shear strain in tension by gage 70, shear and bending strain in tension by gage 72, and shear and bending strain in compression by gage 74. Such an arrangement would be less economical unless it were applied to a single backing, but it would facilitate individual electrical trimming by shunt resistors.

This is significant only with the embodiments of FIGS. 14–17 and does not apply to the embodiments of FIGS. 4–13 because the compensating action in the embodiments of FIGS. 14–17 is dependent upon the resistive value of the portion of the gages which measure bending. In fact, the absence of this dependence in the embodiments of FIGS. 4–13 represents a distinct advantage of those embodiments over the embodiments of FIGS. 14–17.

In all of the foregoing illustrations the strain gage element which occupies one arm of the bridge is in a composite form. Thus, even when a single gage is employed and is spaced from the neutral axis, it is composite in the sense that it simultaneously measures the bending strain, the shear strain and the distortion factor. Likewise, the other forms shown in FIGS. 14– are also composite in that they perform the same functions. Thus, when I employ the term "composite strain gage means" in the appended claims, it refers both to the case where a single component performs the functions and where separate components perform them.

I claim:

1. A strain gage force measuring transducer comprising a beam-like structure having a shear strain surface, means for supporting said structure and for applying a force to be measured thereto at any one of various load points randomly located longitudinally thereof; variable resistance strain gage means affixed to said surface for measuring changes in actual shear strain experienced thereby, said strain gage means being located and oriented on said surface to have the electrical resistance thereof changed by changes in apparent shear strain and by changes in bending strain, with the net resistance changes of said gage means being substantially responsive in substantially directly proportion to changes in actual shear strain; and an electrical circuit coupled to said gage means and being responsive to said net resistance changes to indicate substantially the value of said force to be measured when said force is applied at any one of said various load points.

2. The transducer defined in claim 1 further characterized by a prefabricated backing, said strain gage means mounted on said backing, and said backing affixed to said shear strain surface.

3. The transducer defined in claim 1 further characterized by said strain gage means comprising at least two distinct portions, one for measuring apparent shear strain, and the other for measuring bending strain at least in part.

4. The transducer defined in claim 3 further characterized by the portion for measuring apparent shear strain being located on the neutral axis of said beam-like structure.

5. The transducer defined in claim 1 further characterized by the apparent shear strain being less than the actual shear strain, and with said strain gage means being located and oriented on said surface to have its electrical resistance responsive additively to changes in shear strain and bending strain at least in part.

6. The transducer defined in claim 1 further characterized by the apparent shear strain being greater than the actual shear strain, and with said strain gage means being located and oriented on said surface to have its electrical resistance responsive to changes in shear strain less changes in bending strain at least in part.

7. The transducer of claim 1 further characterized in that said beam-like structure includes a plurality of shear strain surfaces to each of which is affixed at least one said strain gage means.

8. The transducer of claim 7 further characterized by said plurality comprising an even number of said surfaces with one half thereof located on symmetrically and complementarily opposite sides of the center line of said beam-like structure from the other half thereof.

9. The transducer defined in claim 1 further characterized by said strain gage means comprising at least two portions spaced apart on said shear strain surface.

10. The transducer defined in claim 9 further characterized by one said portion on each side of the neutral axis of bending of said beam-like structure.

11. The transducer defined in claim 10 further characterized by one said portion being nearer to said supporting means than the other said portion.

12. The transducer defined in claim 1 further characterized by said circuit comprising a Wheatstone bridge and said strain gage means coupled therein in at least one arm thereof.

13. The transducer of claim 18 further characterized by said strain gage means comprising a plurality of portions each occupying a different arm of said bridge.

14. A strain gage force transducer comprising a plurality of beam-like structures each having a shear strain surface, means for supporting said structures and for applying a portion of a force to be measured to each of said structures at any one of various load points randomly located longitudinally of said structures, variable resistance strain gage means affixed to each said surface for measuring changes in actual shear strain experienced thereby, each said strain gage means being located and oriented on its said surface to have the electrical resistance thereof changed by changes in apparent shear strain and by changes in bending strain, with the net resistance changes of said gage means being substantially responsive in substantially directly proportion to changes in actual shear strain; and an electrical circuit coupled to all of said gage means and being responsive to the sum of said net resistance changes to indicate substantially the value of said force to be measured when said force is applied at any one of said various load points.

* * * * *